United States Patent [19]
Kaneko

[11] Patent Number: 5,572,003
[45] Date of Patent: Nov. 5, 1996

[54] ELECTRIC DISCHARGE MACHINING APPARATUS WITH PAIRS OF LOW INDUCTANCE AND LOW CAPACITANCE CONDUCTORS

[75] Inventor: Yuji Kaneko, Yokohama, Japan

[73] Assignee: Sodick Co. Ltd., Yokohama, Japan

[21] Appl. No.: 363,759

[22] Filed: Dec. 23, 1994

[30] Foreign Application Priority Data

Dec. 24, 1993 [JP] Japan .................................. 5-354942

[51] Int. Cl.⁶ ............................................. B23H 1/02
[52] U.S. Cl. ..................................... 219/69.13; 219/69.18
[58] Field of Search ................... 219/69.12, 69.13, 69.18, 219/69.17

[56] References Cited

U.S. PATENT DOCUMENTS

| | | | |
|---|---|---|---|
| 3,348,015 | 10/1967 | Rhyner et al. | 219/69.13 |
| 4,447,713 | 5/1984 | Tsurumoto et al. | 219/69.18 |
| 4,491,713 | 1/1985 | Patton et al. | 219/69.13 |
| 4,661,674 | 4/1987 | Inoue | 219/69.13 |
| 4,800,248 | 1/1989 | Futamura et al. | 219/69.18 |
| 5,019,685 | 5/1991 | Nishimura | 219/69.13 |

FOREIGN PATENT DOCUMENTS

| | | | |
|---|---|---|---|
| 52-19359 | 5/1977 | Japan . | |
| 59-73226 | 4/1984 | Japan . | |
| 61-056828 | 3/1986 | Japan . | |
| 61-219518 | 9/1986 | Japan | 219/69.13 |
| 62-152618 | 7/1987 | Japan . | |
| 64-27818 | 1/1989 | Japan | 219/69.13 |
| 1-257514 | 10/1989 | Japan | 219/69.17 |

*Primary Examiner*—Geoffrey S. Evans
*Attorney, Agent, or Firm*—Herbert Dubno

[57] ABSTRACT

An electric discharge machining apparatus for machining a workpiece by means of electric discharges using a tool electrode spaced from the workpiece and defining therewith a machining gap, comprising a pair of individual cables with a low capacitance and a coaxial cable with a low inductance to carry a train of successive current pulses from a power supply to the machining gap. The pair of cables are larger in current-carrying capacity than the coaxial cable. A current pulse flowing through the pair of cables is combined with that flowing through the coaxial cable to thereby obtain a total current pulse of a steep slope leading edge while preventing undesirable stray capacitance.

7 Claims, 4 Drawing Sheets

ELECTRIC DISCHARGE MACHINING APPARATUS WITH PAIRS OF LOW INDUCTANCE AND LOW CAPACITANCE CONDUCTORS

FIELD OF THE INVENTION

The present invention relates to an electroerosion machine. More specifically, the present invention relates to an electric discharge machine ("EDM") for performing electric discharge machining on a workpiece using a tool electrode in which a train of successive power pulses are supplied from a power supply to a machine body or machining unit including a machining gap formed between the tool electrode and the workpiece.

BACKGROUND OF THE INVENTION

In general, an electric discharge machine includes a machine body or machining unit having a machining gap formed between a tool electrode and a workpiece being machined, a power supply for supplying electric energy to the machining gap and a dielectric supply device for supplying a dielectric fluid, such as kerosine or water, to the machining gap. The power supply is necessarily positioned with a physical spacing from the machine body and connected to the machine body by means of appropriate conductors.

A train of successive voltage pulses from the power supply are applied across the machining gap to induce electric discharges across the machining gap so that a current starts to flow through the machining gap, thereby resulting in the machining of the workpiece.

It is well known to use a coaxial cable, which has an inner conductor and a conductive shield insulated from the inner-conductor, to reduce the undesirable self-inductance of the conductors connected between the power supply and the machine body. However, the stray capacitance between the inner-conductor and the shield adversely affects the quality of the machined surface of the workpiece particularly when a relatively long cable is used.

OBJECTS OF THE INVENTION

An object of the present invention is to provide an electric discharge machine which can pass current pulses having a steep slope leading edge through a machining gap, thereby increasing machining speed even when a power supply is positioned at a long distance from the machining body or machining unit.

Another object of the present invention is to provide an electric discharge machine which prevents damages on the machined surface of a workpiece due to the stray capacitance between conductors connected between a power supply and a machine body.

Additional objects, advantages and novel features of the invention will be set forth in part in the description which follows, and in part will become apparent to those skilled in the art upon examination of the following, or may be learned by practice of the invention.

SUMMARY OF THE INVENTION

A general aspect of the present invention is the provision of an electric discharge machining apparatus for machining a workpiece by means of electric discharges having a tool electrode spaced from the workpiece and defining therewith a machining gap and a power supply for supplying a machining current to the machining gap and comprising: a first conductor having a first ampacity connected between the power supply and the tool electrode; a second conductor connected between the power supply and the workpiece; wherein the first and second conductors are so arranged to reduce the stray capacitance therebetween; a third conductor connected in parallel to the first conductor having a second ampacity smaller than the first ampacity; and a fourth conductor connected in parallel to the second conductor; wherein the third and fourth conductors are so arranged to reduce the inductance thereof.

Another aspect of the present invention is the provision of a method of machining a workpiece using a tool electrode spaced from the workpiece and defining therewith a machining gap a power supply from which a machining current is intermittently supplied to the machining gap and comprising the steps of: connecting a first conductor between the power supply and the tool electrode; connecting a second conductor between the power supply and the workpiece in such a manner as to reduce the stray capacitance between the first and second conductors; connecting a third conductor in parallel to the first conductor; connecting a fourth conductor in parallel to the second conductor in such a manner as to reduce the inductance of the third and fourth conductors; passing a first current pulse from the power supply through the first conductor, the machining gap and the second conductor; and passing a second current pulse having a steep slope leading edge from the power supply through the third conductor, the machining gap and the fourth conductor during at least a portion of a leading edge of the first current pulse.

BRIEF DESCRIPTION OF THE DRAWING

The accompanying drawing, illustrate embodiments of the present invention and, together with the description, serves to explain the principles of the invention. In the drawing.

DETAILED DESCRIPTION OF THE PREFERRED EMBODIMENTS

Figure 1:
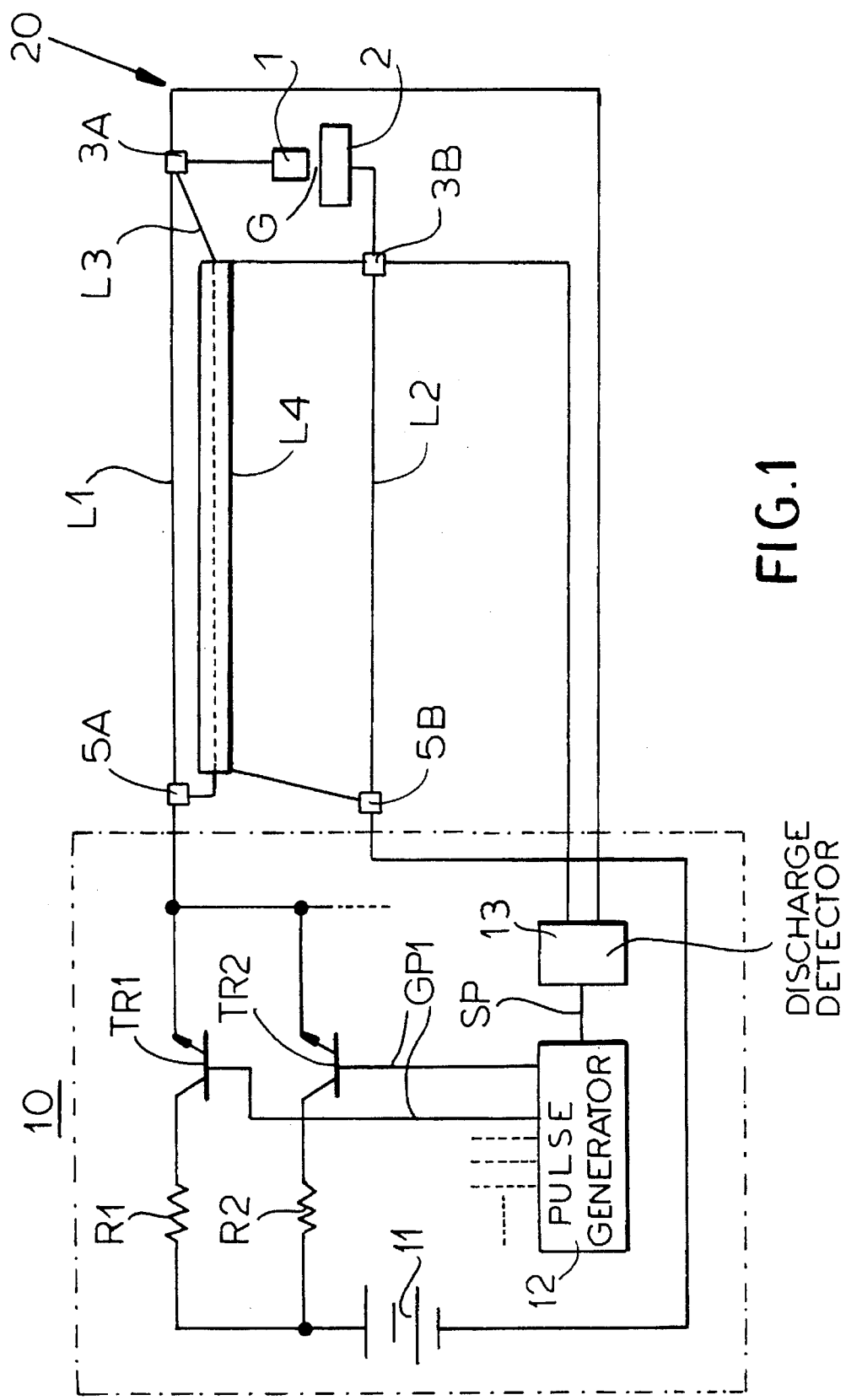
FIG. 1 is a block diagram illustrating an embodiment of the invention as used in an electric discharge machine.

FIG. 1 illustrates an embodiment of an electric discharge machine comprising a power supply 10 and a machine body or machining unit, which includes a tool electrode 1 and a workpiece 2 being machined.

The tool electrode 1 is spaced from the workpiece 2 and defines therewith a machining gap G. The workpiece 2 is securely mounted on an appropriate work table (not illustrated) and submerged in a work tank (not illustrated) filled with a dielectric fluid. The machine body further includes a terminal 3A, which is connected to the tool electrode 1, and a terminal 3B which is connected to the workpiece 2. Preferably terminals 3A and 3B are positioned close to the gap G.

The power supply 10 is provided for intermittently supplying a train of successive machining current pulses having a predetermined ON time to the gap G. The power supply 10 includes a d.c. power source 11, current limiting resistors R1 and R2 and switching transistors TR1 and TR2, all of which are connected in series with the gap G. The resistors R1 and R2 have different magnitudes of resistance, and each is connected in series with a respective one of the transistors TR1 and TR2. The series combinations of the resistors R1 and R2 and the transistors TR1 and TR2 are connected in parallel to each other between the power source 11 and the tool electrode 1. Though an additional combination of a current limiting resistor and a switching transistor may be provided, they have been omitted from FIG. 1 in the interest of clarity and simplicity. The power supply 10 further includes a pulse generator 12 for generating a gating pulse signal GP1 having an ON time and an OFF time. The power supply 10 further includes a discharge detector 13 for monitoring a voltage VG at the gap G and supplying an output signal SP representative of an occurrence of electric discharges to the pulse generator 12. The pulse generator 12 supplies the gating pulse signal GP1 to the transistors TR1 and TR2 so that a voltage from the power source 11 is applied across the gap G to induce electric discharges and then a current flows through the gap G for a predetermined period of time. The power supply 10 includes a terminal 5A, which is connected to the positive terminal of the power source 11 through the transistors TR1 and TR2 and the resistors R1 and R2, and a terminal 5B which is connected to the negative terminal of the power source 11.

Cables L1 and L2 are provided for carrying a current between the power supply 10 and the machine body. In the illustrated embodiment, the cable L1 is connected to the terminal 5A of the power supply 10 at one end and connected to the terminal 3A of the machine body at the other end. The cable L2 is connected to the terminal 5B of the power supply 10 at one end and connected to the terminal 3B of the machine body at the other end. The cables L1 and L2 are each constituted as individual stranded conductors, which are composed of a group of copper wires of small diameter, to reduce the stray capacitance between the cables L1 and L2.

Additionally, a coaxial cable is provided for carrying a current between the power supply 10 and the machine body. The coaxial cable includes an inner conductor L3 and a conductive shield L4 which is arranged coaxially with the inner conductor L3 and insulated therefrom by an appropriate insulator. Each of the conductors L3 and L4 is smaller in cross-sectional area than the cables L1 and L2, for example, about half to reduce the stray inductance of the conductors L3 and L4. In other words, each of the conductors L3 and L4 are smaller in ampacity than the cables L1 and L2. In the illustrated embodiment, the inner conductor L3 is connected to the terminal 5A at one end and connected to the terminal 3A at the other end. The conductive shield L4 is connected to the terminal 5B at one end and connected to the terminal 3B at the other end. In other words, the conductors L3 and L4 are connected in parallel with the cables L1 and L2, respectively.

As will now be appreciated by the artisan, the coaxial cable is used to reduce the inductance of the conductors L3 and L4. Alternatively, a twisted pair, which is composed of two insulated conductors twisted together without a common covering, may be used.

Operation of the machine shown in FIG. 1 will now be described with reference to FIGS. 3A, 3B, 3C, 3D and 3E. FIGS. 3A, 3B, 3C, 3D and 3E are illustrative of waveforms of the gating pulse signal GP1, a voltage VG, a current i1 flowing through the cables L1 and L2, a current i2 flowing through the conductors L3 and L4, and a total current IG, i.e., a combination of currents i1 and i2.

Figure 3A:
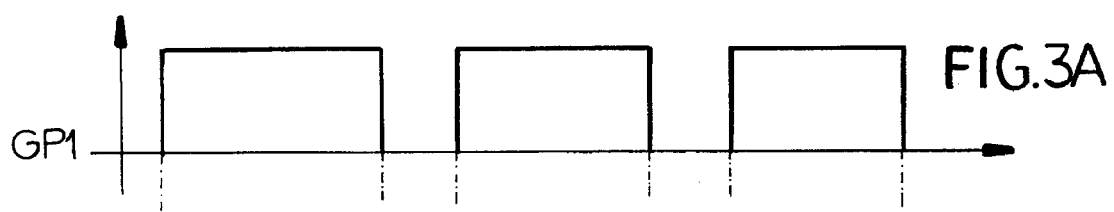
FIGS. 3A to 3E are timing charts illustrating the operation of the machine of FIG. 1.
Figure 3B:
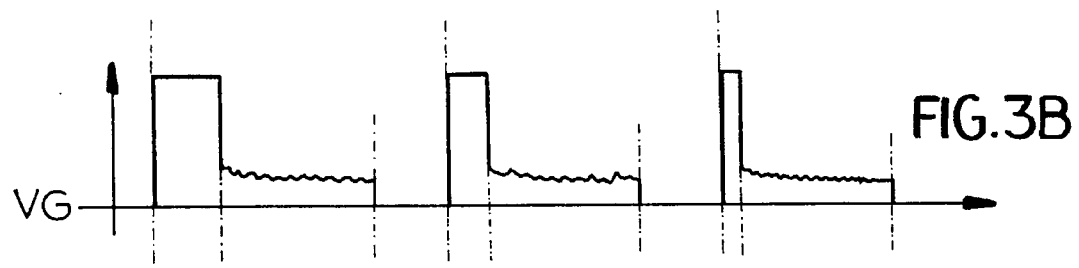
Figure 3C:
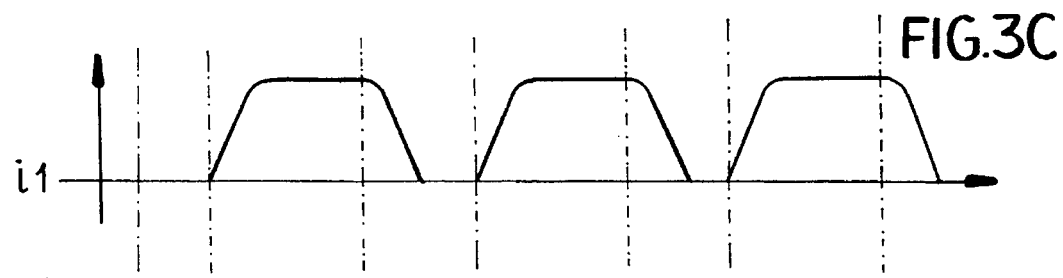
Figure 3D:
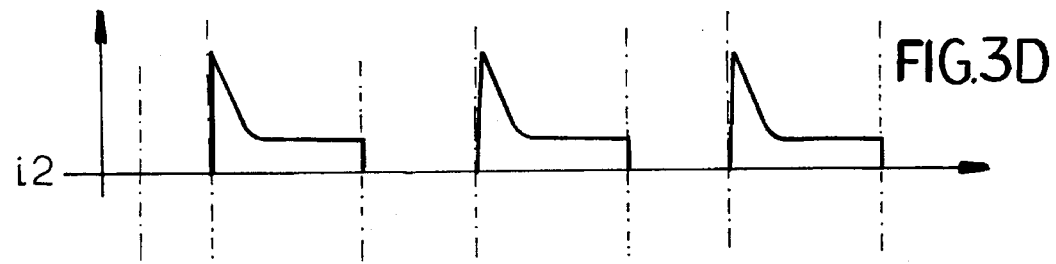
Figure 3E:
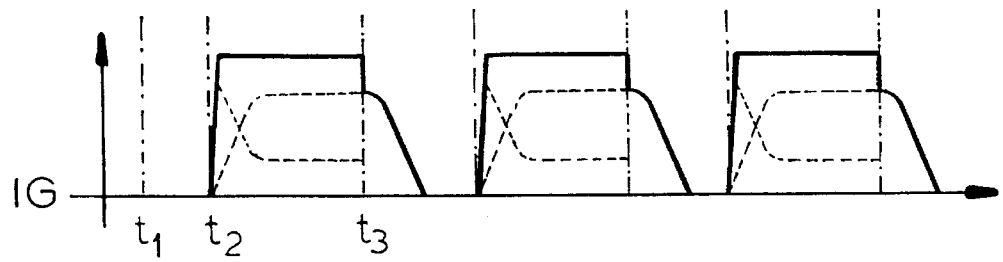
Figure 4A:
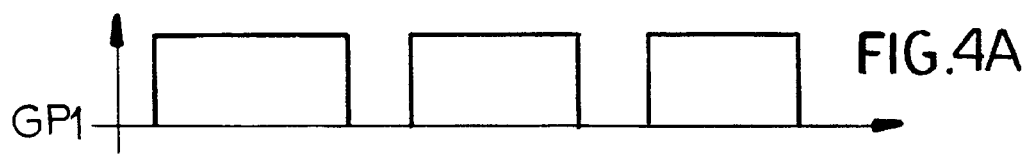
FIGS. 4A to 4F are timing charts illustrating the operation of the machine of FIG. 2.
Figure 4B:
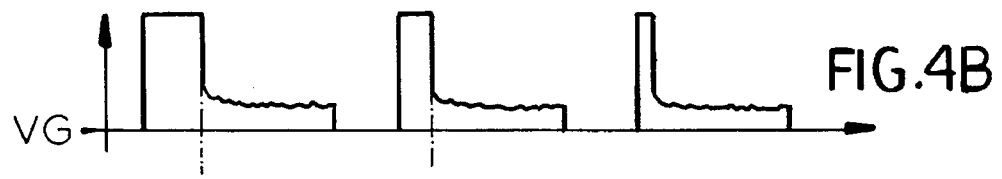
Figure 4C:
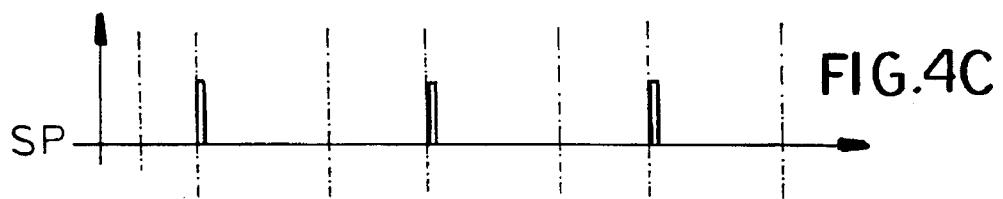
Figure 4D:
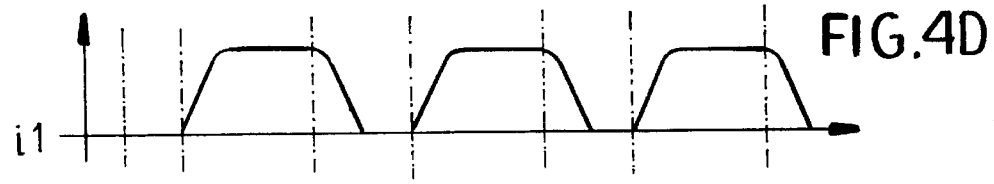
Figure 4E:
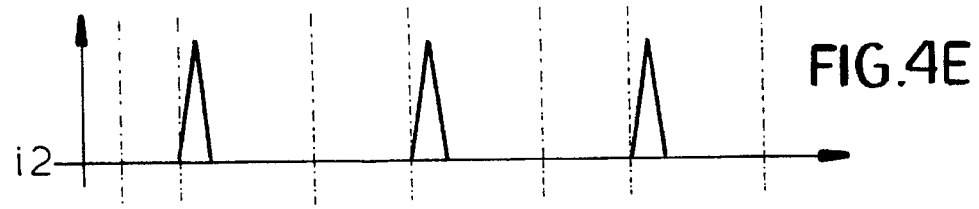
Figure 4F:

At the time t1, when the gating pulse signal GP1 goes high, the transistors TR1 and TR2 are turned on. A voltage from the power source 11 is applied across the gap G. Thereby, at the time t2, electric discharges are caused to start in the gap G and a current i2 starts to flow through the gap G. As shown in FIG. 3D, a current i2 suddenly increases due to low inductance of the conductors L3 and L4. As shown in FIG. 3C, a current i1 gradually increases to its steady value while a current i2 decreases to its steady value, as shown in FIG. 3C. The steady value of current i1 is inversely proportional to the total resistance of the cables L1 and L2 and the gap G. The steady value of current i2 is inversely proportional to the total resistance of the conductors L3 and L4 and the gap G. In the illustrated embodiment, the cables L1 and L2 are larger in cross-sectional area than the conductors L3 and L4 so that the steady value of current i1 is larger than that of current i2. The cables L1 and L2 and the conductors L3 and L4 are only sufficiently large to pass mean currents i1 and i2, respectively. The gating pulse signal GP1 is in an ON state a predetermined time after the generation of the signal SP. At the time t3, when the gating pulse signal GP1 is turned off, a current i2 suddenly drops. While, a current i1 gradually decreases. As shown in FIG. 3E, a total current IG flowing through the gap G has a steep slope on its leading edge.

Figure 2:
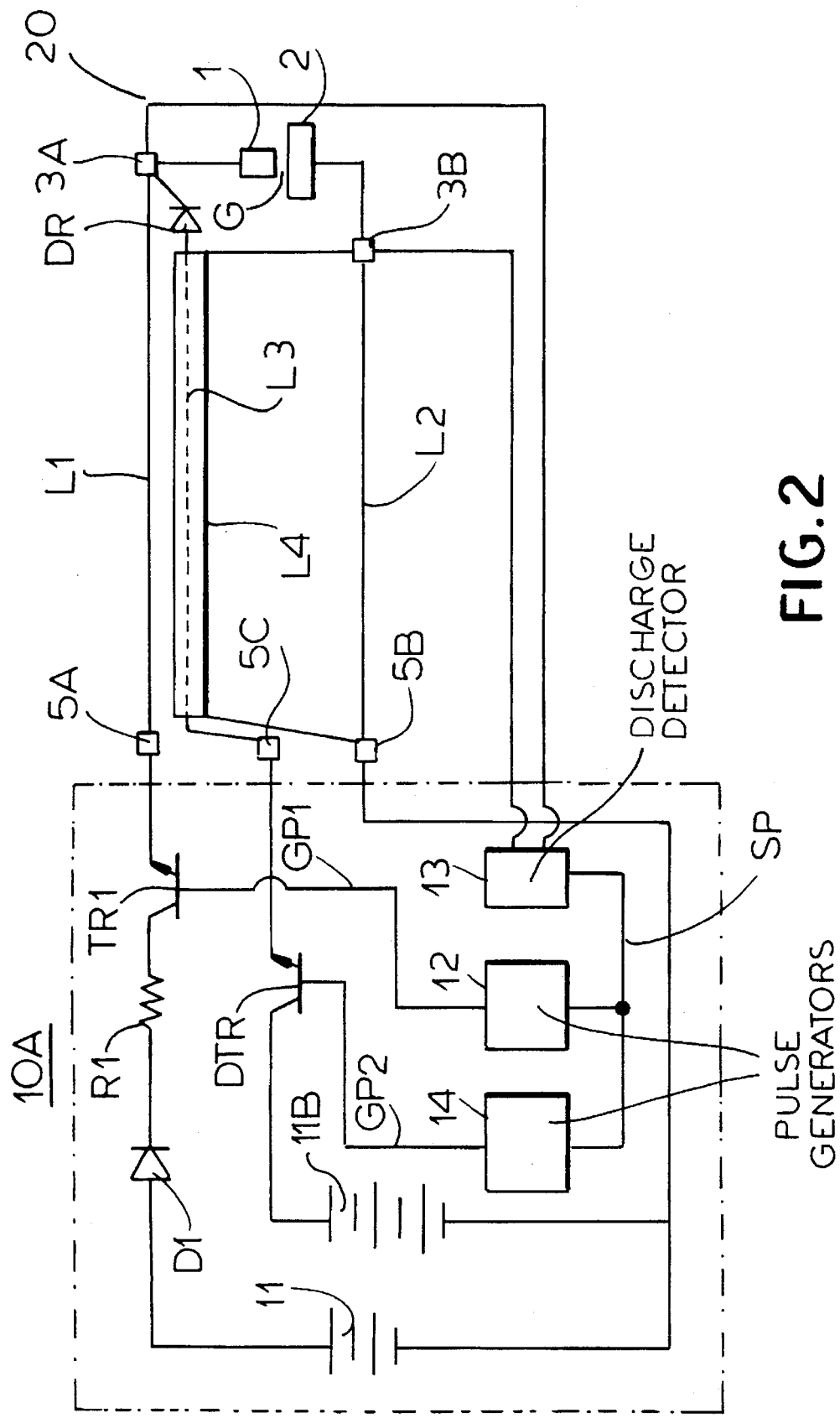
FIG. 2 is a block diagram illustrating another embodiment of the invention as used in an electric discharge machine.

FIG. 2 illustrates another embodiment of an electric discharge machine, which is suitable, for example, for the machining of a cemented carbide workpiece by means of a copper tungsten electrode or the machining of a steel workpiece by means of a steel electrode. Similar elements are labelled with similar reference numerals as used in FIG. 1.

In FIG. 2, a power supply 10A includes a first series combination consisting of the d.c. power source 11, a diode D1 for reverse-current protection, the current limiting resistor R1 and the switching transistor TR1, all of which are connected in series to the terminal 5A. Though an additional combination of a diode, a current limiting resistor and a switching transistor may be provided, they have been omitted from FIG. 2 in the interest of clarity and simplicity.

The power supply 10A further includes a second series combination consisting of a variable voltage, d.c. power source 11B, adjustable between approximately 100 volts and 300 volts, and a switching transistor DTR. In addition, the power supply 10A includes a terminal 5C to which the inner conductor L3 is connected at one end. The power source 11B is connected to the terminal 5C through the transistor DTR at its positive terminal and connected to the terminal 5B at its negative terminal. The first and second series combinations are connected in parallel to each other. The power supply 10A further includes a pulse generator 14, which is provided connected to the discharge detector 13 for generating a gating pulse signal GP2 having an ON time and an OFF time. For example, each of the pulse generators 12 and 14 may include appropriate clock oscillator and counter. The pulse generator 14 turns on the transistor DTR so that a high peak current flows through the gap G a predetermined short time after an occurrence of electric discharges. A diode DR is provided between the cable L1 and the conductor L3 for preventing a voltage from the power source 11 from being applied across a spacing between the conductors L3 and L4.

Operation of the machine shown in FIG. 2 will now be described with reference to FIGS. 4A, 4B, 4C, 4D 4E and 4F. FIGS. 4A, 4B, 4C, 4D, 4E and 4F are illustrative of waveforms of the gating pulse signal GP1, a voltage VG, the signal SP, a current i1, a current i2, and a total current IG.

At the time t1, when the gating pulse signals GP1 and GP2 go high, the transistors TR1 and DTR are turned on. The power sources 11 and 11B apply a voltage across the gap G. Thereby, at the time t2, electric discharges are caused to start in the gap G and a current i2 starts to flow through the gap G. At the time t2, a discharge detector detects drop of a voltage VG and supplies the signal SP to the pulse generators 12 and 14. After a predetermined short time upon receipt of the signal SP the pulse generator 14 turns off the transistor DTR. Preferably, the transistor DTR is closed at least about a half of the time during which a current i1 does not reach its steady value though a current flows through the gap G. A peak value of current i2 can be set to a desired value by adjusting a voltage of the power source 11B. Alternatively, it may be set by varying an ON time of the gating pulse signal GP2.

The foregoing description of a preferred embodiment of the invention has been presented for purposes of illustration and description. It is not intended to be exhaustive or to limit the invention to the precise form disclosed, and obviously many modifications and variations are possible in the light of the above teaching. For example, a voltage may be applied across the gap G with the tool electrode 1 being negatively poled and the workpiece 2 being positively poled. It is intended that the scope of the invention be defined by the claims appended hereto.

I claim:

1. An electric discharge machining apparatus comprising:
   a machining unit having a tool electrode spaced from a workpiece to be machined by electrical discharges and defining a machining gap with said tool electrode, said workpiece constituting a workpiece electrode;
   a power supply spaced from said machining unit and comprising:
      source means for supplying electrical energy for said discharges,
      first switch means connected to said source means for supplying at a terminal of said power supply, a first current pulse contributing to a machining discharge, and
      second switch means connected to said source means for supplying at a terminal of said power supply, a second current pulse during generation of said first current pulse and with a steep leading flank, said terminals of said first and second switch means being connectable to one of said electrodes, another terminal of said power supply being connectable to the other of said electrodes; and
   conductor means for connecting said power supply with said machining unit and comprising:
      a low-capacitance pair of conductors connecting said terminal of said first switch means with said one of said electrodes and said other terminal of said power supply with said other of said electrodes, and
      a low-inductance pair of conductors connecting said terminal of said second switch means with said one of said electrodes and said other terminal of said power supply with said other of said electrodes, said conductor of said low-inductance pair connecting said terminal of said second switch means with said one of said electrodes having a lower ampacity than said conductor of the low-capacitance pair which connects said terminal of said first switch means with said one of said electrodes.

2. The electric discharge machining apparatus defined in claim 1 wherein said terminal of said first switch means and said terminal of said second switch means are a common terminal of said power supply.

3. The electric discharge machining apparatus defined in claim 2 wherein said one of said electrodes is said tool electrode and said other of said electrodes is said workpiece.

4. The electric discharge machining apparatus defined in claim 3 wherein said low-inductance pair of conductors is a coaxial cable having an inner conductor connected to said tool electrode and a shield connected to said workpiece.

5. The electric discharge machining apparatus defined in claim 1, further comprising a discharge detector connected to said gap for triggering said second switch means at a predetermined time after an occurrence of a discharge at said gap.

6. A method of machining a workpiece comprising the steps of:
   juxtaposing a workpiece forming a workpiece electrode with a tool electrode across a machining gap in a machining unit;
   at a power supply spaced from said machining gap triggering a first switch means to generate a first current pulse and triggering a second switch means to generate a second current pulse with a steep leading flank at least during a portion of a leading flank of said first current pulse; and
   supplying said current pulses to said gap to generate a machining discharge thereacross by connecting a low-capacitance pair of conductors between said first switch means and one of said electrodes and between another terminal of said power supply and the other of said electrodes, and by connecting a low-inductance pair of conductors between said second switch means and said one of said electrodes and between said other terminal of said power supply and said other of said electrodes, said conductor of said low-inductance pair connecting second switch means with said one of said electrodes having a lower ampacity than said conductor of the low-capacitance pair which connects said first switch means with said one of said electrodes.

7. An electric discharge machining apparatus comprising:
   a machining unit having a tool electrode spaced from a workpiece to be machined by electrical discharges and defining a machining gap with said tool electrode, said workpiece constituting a workpiece electrode;
   a power supply spaced from said machining unit and comprising:
      source means for supplying electrical energy for said discharges, and
      switch means connected to said source means for supplying at a terminal of the power supply a series of current pulses; and
   conductor means for connecting said power supply with said machining unit and comprising:
      a low-capacitance pair of conductors, and
      a low-inductance pair of conductors one of said low-capacitance pair and one of said low-inductance pair being connected in parallel between said terminal of the power supply and one of said electrodes the other of said low-capacitance pair and the other of said low-inductance pair being connected in parallel between another terminal of the power supply and the other of said electrodes said conductor of low-inductance pair having a lower ampacity than said conductor of the low-capacitance pair whereby a first current pulse contributing to a machining discharge is supplied through said conductor of low-capacitance pair and a second current pules with a steep leading flank is supplied through said conductor of low-inductance pair.

* * * * *